United States Patent [19]

Willey

[11] Patent Number: 4,695,067
[45] Date of Patent: Sep. 22, 1987

[54] WHEELED ARTICLE CARRIER

[76] Inventor: Robert P. Willey, 8835 Phoenix Ave., Fair Oaks, Calif. 95628

[21] Appl. No.: 847,912

[22] Filed: Apr. 3, 1986

[51] Int. Cl.⁴ .............................................. B62B 1/14
[52] U.S. Cl. ................................. 280/47.22; 269/237; 269/254 R; 269/905; 280/47.13 R
[58] Field of Search ................. 280/43, 43.1, 47.13 R, 280/47.15, 47.22; 269/905, 254 R, 254 MW, 237

[56] References Cited

U.S. PATENT DOCUMENTS

| 426,474 | 4/1890 | Smalley et al. | 280/35 |
|---|---|---|---|
| 490,043 | 1/1888 | Rayburn et al. | 280/47.22 |
| 848,837 | 4/1907 | Marz et al. | 269/237 |
| 1,103,486 | 7/1914 | Cobb | 280/47.13 R |
| 2,546,726 | 3/1951 | Creamer | 280/47.13 R |
| 2,639,926 | 5/1953 | Parks | 280/47.15 |
| 3,580,601 | 5/1971 | Miles | 280/47.13 R |
| 3,717,357 | 2/1973 | Schaefer | 280/35 |
| 3,845,969 | 11/1974 | Nadeau | 280/47.13 R |
| 3,871,054 | 3/1975 | Schaefer | 414/11 |
| 3,942,813 | 3/1976 | Dombroski | 280/47.13 R |

Primary Examiner—David M. Mitchell
Assistant Examiner—Richard Camby
Attorney, Agent, or Firm—Leonard Bloom

[57] ABSTRACT

A wheeled carrier for transporting elongate articles having a wheeled axle, a dynamic clamp for the article including spring biasing to return the clamp to a relaxed position when the article is removed therefrom, and a suspension extending between the clamp and the axle to absorb shocks transmitted from the wheels so that the clamping force on the article is substantially constant. A "T" handle will move the carrier when empty by picking up the entire carrier, due to its light weight.

25 Claims, 6 Drawing Figures

WHEELED ARTICLE CARRIER

FIELD OF THE INVENTION

The following invention relates generally to a wheeled carrier for elongate yet relatively thin articles such as doors, plywood, and sheet rock.

BACKGROUND OF THE INVENTION

Anyone versed in the nuances of the construction industry can readily appreciate that transporting relatively large elongate objects having negligible thickness with respect to the length and width thereof favors a person who has youth and strength. Sheet rock, plywood and doors all are cumbersome to carry not only because of their size and weight, but also because one has to navigate about obstructions prevalent on a construction site.

The following patents reflect prior art techniques in overcoming these well known objections with respect to the transport of elongate articles:

| 426,474 | Smalley, et al. | April 29, 1890 |
|---|---|---|
| 1,103,486 | Cobb | July 14, 1914 |
| 2,546,726 | Creamer | March 27, 1951 |
| 2,639,926 | Parks | May 26, 1953 |
| 3,580,601 | Miles | May 25, 1971 |
| 3,717,357 | Schaefer | February 20, 1973 |
| 3,845,969 | Nadeau | November 4, 1974 |
| 3,871,054 | Schaefer | March 18, 1975 |
| 3,942,813 | Dombroski | March 9, 1976 |

Some of these prior art techniques are objectionable in that they are bulky or cumbersome themselves, others require adjustment to accomodate articles having different dimensions and some are incapable of traversing obstacles commonly found on construction sites, such as power cables, scrap lumber, etc.

For example, the patent to Cobb provides an "auto grip" form truck where the weight of the article to be carried provides a clamping force to facilitate its transport. However, should the wheels encounter an obstacle, the clamping force on the article to be carried will be directly effected by the obstacle, causing the article to temporarily become loose, causing the load to shift and/or mar the article.

Like Cobb, Nadeau provides a carrier for elongate articles which similarly encounters difficulties when confronting obstacles in the path of the wheels. To overcome this, an adjustment (48) is required to administer the clamping force and must be changed for diverse articles. Notwithstanding the adjustment, there is still a pronounced tendency to disturb the clamping force, thereby marring the article to be carried in the presence of an obstacle.

The remaining citations show the state of the art and diverge even further from the nexus of applicant's invention.

SUMMARY OF THE INVENTION

By way of contrast, the instant invention is distinguished over the known prior art in that, while the clamping force administered to the article to be carried is directly related to the weight of the article itself, this clamping force is isolated from the wheeled axle such that the wheels can encounter the jump 1×4's the shielded cable without altering the clamping force on the article.

In addition, the instant invention is distinguished over the known prior art in that the elongate article to be carried can be "self-centered" to balance the load with respect to the axle with a minimal amount of effort. To this end, a handle is provided which in a rest position, in conjunction with the wheels on the axle, serves as a three point support system providing a stationary carrier while the elongate article is first roughly centered and placed within the clamp. When the elongate article is loaded on the axle from the same side as the handle and once the approximate center is found for the article, tipping the article so that it is solely supported on the axle lifts the handle up from the floor providing clearance for the transport of the article.

In addition, by having a handle type support, the article can be placed at rest in a stable manner so that when an article such as a door is to be hung, it can be engaged by the article carrier on a bottom surface edge on the door and can be oriented adjacent the door jamb for easy installation. By having the clamping force applied on the elongate article directly related to the weight of the article, orientation of the article such as a door can be accomplished in a facile manner simply by the craftsman sharing a portion of the weight of the door with the carrier.

Importantly, for prior art devices to work effectively, the clamping force had to be such that damage may occur by providing an excessive clamping force either in using an adjustable clamp, or when a weight responsive clamp receives shocks through the wheels and axle when traversing an obstacle.

OBJECTS OF THE INVENTION

Accordingly, it is a primary object of this invention to provide a new and novel article carrier.

A further object contemplates providing a device as characterized above where the clamping force on the article is solely dependent upon the article's weight and that the clamp is insulated from shocks passed through the wheels so that effective change in the weight due to the wheels' encountering obstacles can be negated.

A further object contemplated providing a device as set forth hereinabove which will not mar the finish of the article being carried.

It is yet a further object of this invention to provide a device as is characterized above which is stable for the purposes of loading the elongate article thereupon or for subsequent orientation of the article when it is being used, such as when hanging a door.

A further object of this invention contemplates providing a device as characterized above which can encounter and traverse obstacles without any deleterious effects.

A further object of this invention contemplates providing a device as set forth above which will release the clamping force on the article to be carried by merely lifting the article away from the clamp. Thus, a clamp is provided which is automatically adjustable for differently dimensioned articles.

A further object of this invention contemplates providing a device as characterized above which is extremely lightweight for transportability, extremely durable in construction and is extremely safe to use.

A further object of this invention contemplates providing a device as characterized above which lends itself to mass production techniques.

These and other objects will be made manifest when considering the following detailed specification when taken in conjunction with the appended drawing figures wherein there has been provided a wheeled carrier for transporting elongate articles having an axle with wheels at the the extremities of the axle, a dynamic clamp for the article including an instrumentality for applying clamping pressure solely as a function of the article's weight on the clamp whereby the clamp is completely and automatically disengaged by removing the article and automatically engaged by merely placing the article thereon, and a suspension instrumentality connected between the clamp and the axle to absorb shocks from the wheels to the clamp so that obstructions and surface irregularities encountered by the wheels are isolated from the clamp thereby providing a substantially constant clamping force on the article.

BRIEF DESCRIPTION OF THE DRAWING FIGURES

BRIEF DESCRIPTION OF THE PREFERRED EMBODIMENT

Figure 1:
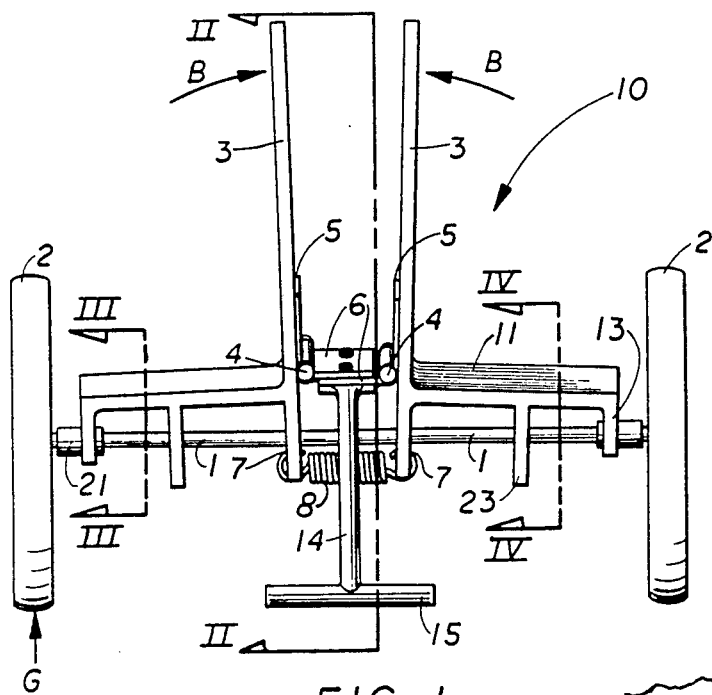
FIG. 1 is an elevational front view of the apparatus according to the present invention.

Referring to the drawings now, wherein like reference symbols refer to like parts throughout the various drawing figures, reference numeral 10 is directed to the wheeled carrier for transporting elongate articles according to the present invention.

As shown in FIG. 1 for example, the carrier 10 includes an axle 1 of substantially elongate cylindrical configuration having ends provided with wheels 2 thereat. The wheels may be supported on the axle 1 through any known bushing arrangement as can be appreciated by one skilled in the art.

A clamping instrumentality is provided formed by two upwardly extending plates 3 which are spaced from each other such that an article A can be placed there between. The plates 3 are caused to move in the direction of the arrows B in the following manner. A lower most portion of each plate 3 is provided with a hole 7 through which passes hooked ends of a spring 8. This spring tends to resist motion of the plates 3 in the direction of the arrows B.

Figure 2:
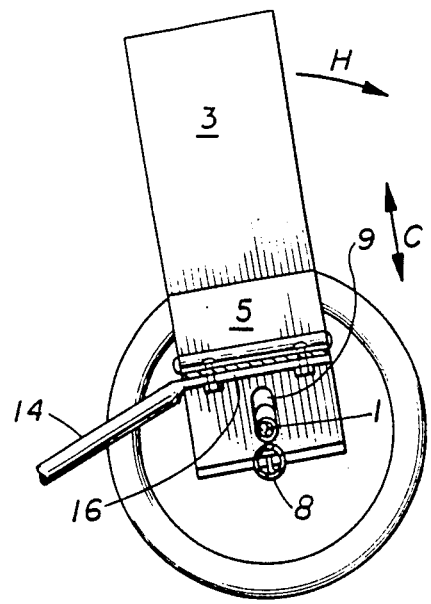
FIG. 2 is a sectional view taken along lines 2—2 of FIG. 1.

Approximately one-third up the length of each plate away from the spring 8 a pair of hinges are provided. A hinge pin 4 is placed on a side of each plate 3 so that the hinge pin on each plate faces one another but are at slightly different horizontal elevations. Each hinge pin has a hinge plate 6 each extending towards the other plate so that the hinge plates 6 are connected one on top of the other as shown in FIG. 2. Thus, the location of the lower most hinge pin 4 is at a different horizontal elevation substantially equal to the thickness of the hinge plate 6. Each hinge pin 4 is connected to its respective plate 3 by means of a second hinge plate 5 attached to a surface of the plate 3 facing the opposite plate 3. When the article A is placed between the two plates 3 such that an edge thereof resides against the top most hinge plate 6, the force F is transferred to each of the hinge plates 6, but due to their rigid interconnection, a turning moment is provided which passes through the top most extremity of each plate 3 causing motion of the plates in the direction of the arrows B and opposed by the spring 8.

In this manner, the clamp is directly responsive to the article's weight and the pressure exhibited on the article to be carried is solely a function of the article's weight with the absolute force in the direction of the arrows B altered by the spring tension in the spring 8. The true effect of the spring 8 however, is to cause the plates 3 to open up when the force F of the article A is relieved from its bearing against the hinge plates 6. In this way, the clamp is automatically freed and engaged.

It is important to note that if this clamp were rigidly and unyieldingly attached to the axle, the clamping pressure would be altered when the wheels had to encounter obstacles or uneven terrain. That is, loading on one of the wheels 2 in the presence of an obstruction would provide a force impulse G which would temporarily increase the clamping force applied on the article to be carried, but a force in a direction opposite from the arrow shown as G would cause temporary "weightlessness" of the article carried and would loosen the clamp. Thus, the loading of the clamp on the article would not be constant and a danger of dislodging the article exists as well as marring the external surface of the article carried by sudden load shifts and changes in the force.

Figure 3:
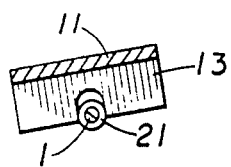
FIG. 3 is a sectional view taken along lines 3—3 of FIG. 1.
Figure 5:
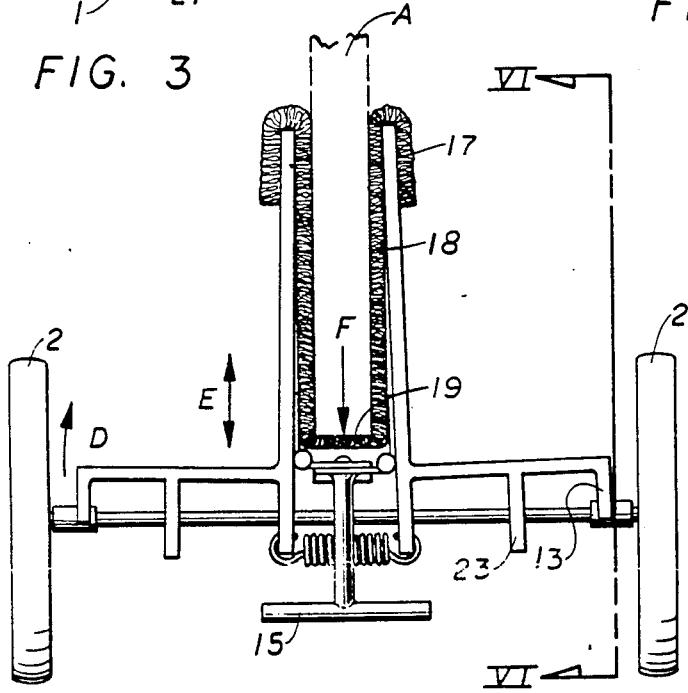
FIG. 5 is an elevational view of the front of the apparatus similar to FIG. 1 with the apparatus in a stressed or utilized mode and includes padding along the areas of clamping where it contacts the article.
Figure 6:
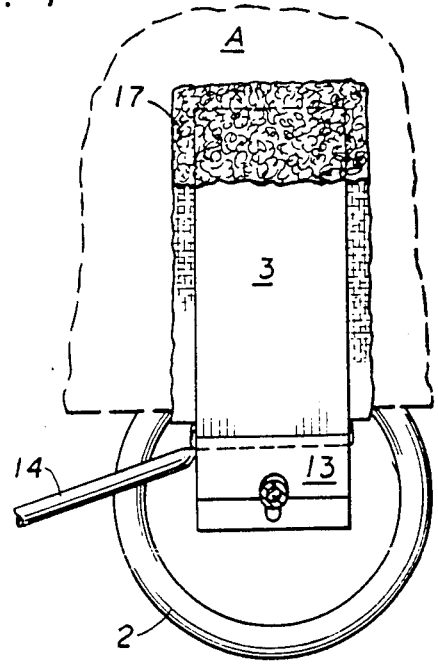
FIG. 6 is a sectional view taken along lines 6—6 of FIG. 5.

Attention is directed to FIG. 5 of the drawing figures which teaches the provision of padding placed on each of the plates 3 extending down to the hinge plates 6. A portion of the padding is turned over the top most edge of each plate. Not only does the padding prevent marring of the article but also it provides a further form of damping. More particularly, the padding as shown in FIG. 3 is substantially 'U' shaped, filling the trough between the two plates 3 and having vertically upwardly extending legs 18, a bight portion 19 and a turned over portion 17 extending over the top most portion of each plate 3.

The problems with the wheels engaging obstacles is further overcome by means of a suspension mechanism which isolates a great degree the clamping plates from variations in the surface upon which the wheels are placed.

As shown in FIG. 2, a slot 9 is provided in each plate 3 which allows clearance of the axle 1 to pass therethrough so that the axle 1 can move in the direction of the arrows C (with respect to plate 3). Each plate 3 has an arm 11 above the axle extending outwardly towards each wheel and each arm 11 is supported on the axle by means of a downwardly extending ear tab 13 which engages the axle 1 in one of two manners. In a first embodiment, each tab is attached to the axle through a bushing with relative little play and the arms 11 are selected from a class of materials having sufficient springing resiliency to serve as a damping force so that each arm 11 flexes in the direction of the arrow E of FIG. 5.

In a second form of the invention, the ear tab 13 is connected to the axle 1 in such a manner that angulation of each tab is provided with respect to axle 1. Thus, the bearing surface between the tab and the axle is the area for deflection allowing a bending moment in the direction of the arrow D in FIG. 5. Thus, if the bearing on each tab 13 provides clearance between the bearing and the axle 1, there is room for deflection at that point. Alternatively, the suspension may be formed as a hybrid of both the arm 11 having resiliency and the bearing having sufficient clearance so that both can work in conjunction to serve the purposes of the invention. FIG. 3 shows a bearing 21 which allows clearance for vertical but not horizontal motion of axle 1

A handle 14 is provided which extends from tongue 16 at one end at a bottom most portion of the lower hinge plate 6, to another end 15 defined as a 'T' shaped handle so that the device can be utilized in the following manner:

The article carrier 10 is canted as shown in FIG. 2 so that the 'T' shaped handle end 15 engages the supporting surface along with the wheels 2, providing a three point support system. The handle is primarily for toting the carrier when not in use. An elongate article A is lifted and translated from the direction of the handle 14 onto the article carrier 10 and threaded between the two plates 3. When the approximate center of the elongate article A passes between the two plates 3 allowing the weight of the article A to be placed in the clamp, the force F will cause the clamp to lock. Rotation of the article A will allow the carrier 10 to be moved in the direction of the arrow H of FIG. 2 so that the handle 15 is removed from the support surface and the carrier rides solely on the two wheels 2 in either direction. The elongate article is then ready for transport. Should the article carrier be used for hanging doors, the bottom most edge of the door is placed directly above the top most hinge plate 6 substantially at its midpoint and the door can be then oriented with respect to the door jamb for ease in hanging. By relieving a portion of the article's weight denoted by the arrow F, the door can be removed from the article carrier 10 and hung.

Figure 4:
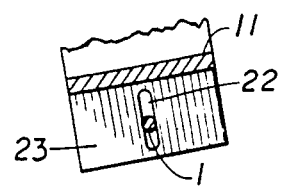
FIG. 4 is a sectional view taken along lines 4—4 of FIG. 1.

Attention is directed to FIG. 4 which reflects a guide 23 which extends down from arm 11 between the ear 13 and plate 3. The guide 23 includes a vertical slot 22 (similar to slot 9 of FIG. 2) through which axle 1 passes which allows for vertical motion of arm 11 but contrains against horizontal motion. The guide could also be placed adjacent and inboard the bearing 21.

Although the drawings suggest the carrier is formed from bar stock which can be welded as required, it should be clear that portions of the carrier could also be cast for cost savings on mass production. If cast, the pivot 4 can be integrally cast with plate 3 and arm 11. Then a single hinge plate 6 can be used.

Moreover, having just described the invention it should be apparent that numerous structural modifications are contemplated as being part of this invention as set forth hereinabove and defined hereinbelow by the claims.

I claim:

1. A wheeled carrier for transporting elongate articles comprising in combination:
    an axle having wheels at extremities of said axle,
    a dynamic clamp for the article including means for applying clamping pressure solely as a function of the article's weight on said clamp whereby said clamp is completely and automatically disengaged by removing the article and automatically engaged by merely placing the article thereon, and
    a suspension means connected between said clamp and said axle to absorb shocks from said wheels to said clamp so that obstructions and surface irregularities encountered by said wheels are dampened from said clamp thereby providing a substantially constant clamping force on the article wherein said dynamic clamp is formed from a pair of vertically spaced plates extending upwardly from said axle facing each other and supported by said suspension means, said plates interconnected through hinge means extending between said plates at a lower portion thereof to allow articulation of said plates about said hinge means, and biasing means interconnected between said plates below said hinge means to cause said clamp to normally remain in a substantially open receiving position for the insertion therein of the elongate article to be carried, wherein each of said plates is provided with a vertically extending slot below said hinge means and above said biasing means through which passes said axle to allow for relative motion of said plates with respect to said axle.

2. The carrier of claim 1 wherein said suspension means includes first and second arms extending to outer surfaces of said plates said arms overlying said axle and connected thereto by tab members such that said arms are cantilevered from said axle to said plates, and bearing means on said tab members depending from extremities of said arms remote from said plates.

3. The article carrier of claim 2 including padding means on facing surfaces of said plates and on said hinge means to provide damping with respect to the article to be carried and also to prevent marring of the exterior surface of the article.

4. The article carrier of claim 3 wherein said hinge means are formed from two hinges each having a pivot area and hinge plates extending outwardly therefrom, one said hinge plate attached to said facing surface of each said plate and another hinge plate extending outwardly towards said opposed plate, both said outwardly extending hinge plates inter connected such that a bottom wall is formed defining a trough.

5. A wheeled carrier for transporting elongate articles comprising in combination:
    an axle having wheels at extremities of said axle,
    a dynamic clamp for the article including means for applying clamping pressure solely as a function of the article's weight on said clamp whereby said clamp is completely and automatically disengaged by removing the article and automatically engaged by merely placing the article thereon, and
    a suspension means connected between said clamp and said axle by means of a first arm cantilevered towards said dynamic clamp and supported by tab members on said axle to absorb shocks from said wheels to said clamp caused by obstructions and surface irregularities encountered by said wheels thereby providing a substantially constant clamping force on the article, wherein said dynamic clamp is formed from a pair of vertically disposed facing plates extending upwardly from said axle and supported by said suspension means, said plate interconnected via hinge means extending between said plates at a lower portion thereof to allow articulation of said plates about said hinge means, and biasing means interconnected between said plates below said hinge means to cause said clamp to remain when at rest in a substantially open receiving position for the insertion therein of the elongate article to be carried.

6. The carrier of claim 5 wherein each of said plates is provided with clearance for said axle to allow for relative motion of said plates with respect to said axle.

7. The article carrier of claim 6 wherein said suspension means includes said first arm and a second arm extending to outer surfaces of said plates above said axle and connected thereto such that said arms are cantilevered from said axle to said plates, and bearing means on tab members depending from extremities of said arms remote from said plates engaging said axle.

8. The article carrier of claim 6 including padding means on facing surfaces of said plates and on said hinge means to provide damping with respect to the article to be carried and also to prevent marring of the exterior surface of the article.

9. The article carrier of claim 8 wherein said hinge means are formed from two hinges each having a pivot area and hinge plates extending outwardly therefrom, one said hinge plate attached to each said vertically extending plate and another said hinge plate extending towards outwardly said opposed plate, each said outwardly extending hinge plate interconnected such that a bottom wall is formed defining a trough.

10. A wheeled carrier for transporting elongate articles comprising in combination:
an axle having wheels at extremities of said axle,
a padded dynamic clamp for the article including a pair of upwardly extending plates interconnected at a lowermost portion by biasing means, for applying clamping pressure solely as a function of the article's weight on said clamp whereby said clamp is completely and automatically disengaged by removing the article and automatically engaged by merely placing the article thereon, and
a suspension means connected between said clamp and said axle by means of resilient arms cantilevered towards said dynamic clamp and supported by tab members on said axle to absorb shocks from said wheels so that obstructions and surface irregularities encountered by said wheels are diminished thereby providing damping on the article, wherein said dynamic clamp is formed from a pair of vertically disposed facing plates extending upwardly from said axle and supported by said suspension means, said plate interconnected through hinge means extending between said plates at a lower portion thereof to allow articulation of said plates about said hinge means, and biasing means interconnected between said plates below said hinge means to cause said clamp to remain when at rest in a substantially open receiving position for the insertion therein of the elongate article to be carried.

11. The carrier of claim 10 wherein each of said plates is provided with a vertically extending slot away from the clamp area through which passes said axle to allow for motion of said plates to said axle therebetween.

12. The carrier of claim 11 wherein said suspension means includes first and second said arms extending to outer surfaces of said plates overlying said axle and connected thereto by tag members such that said arms are cantilevered from said axle to said plates, and bearing means on said tab members depending from extremities of said arms remote from said plates.

13. The article carrier of claim 12 including said padding on facing surfaces of said plates and on said hinge means to provide damping with respect to the article to be carried and also to prevent marring of the exterior surface of the article.

14. The article carrier of claim 13 wherein said hinge means are formed from two hinges each having a pivot area and hinge plates extending outwardly therefrom, one said hinge plate attached to one said vertically extending plate and another extending towards said other vertical plate, each said outwardly extending hinge plate interconnected such that a bottom wall is formed defining a trough.

15. The carrier of claim 14 including a handle extending from a bottom surface of a lowermost hinge plate to a 'T' shaped handle end which in combination with said wheels, forms a three point suspension system for loading the article.

16. The carrier of claim 15 wherein said tabs are provided with clearance at their connection with said axle to allow deflection thereat.

17. An article carrier, comprising in combination:
an axle having wheels at extremities thereof,
frame means bearing on said axle adjacent said wheels,
said frame means including a clamp means held by a spring below said axle,
clearance slots on said clamp means through which said axle passes, and said clamp means includes a connecting member above the axle about which said clamp means pivots for grasping the article.

18. The device of claim 17 wherein said clamp means is formed by two upwardly extending plates which are spaced from each other such that the article can be placed therebetween.

19. The device of claim 17 wherein said connecting member includes at least one hinge so that said clamp means can move thereabout.

20. The device of claim 17 wherein said clamp means are provided with padding along an area where said clamp means grasp the article to prevent marring.

21. The device of claim 17 wherein said frame means includes arms extending from its bearing on said axle and supporting said clamp means, said arms formed from a class of materials having sufficient resiliency to provide a damping force allowing said arms to flex.

22. The device of claim 17 wherein said frame means is carried on said axle by bearings having sufficient play to allow deflection of said frame means thereby providing damping.

23. The devide of claim 17 wherein said frame includes arms extending from said frame's area of attachment to said axle and supporting said clamp means, said arms formed from a class of materials having sufficient resiliency to provide a damping force and allowing said arms to flex, wherein said frame means is carried on said axle by bearings having sufficient play to allow deflection of said frame means thereby providing damping.

24. The device of claim 17 wherein a handle is provided including a tongue fastened to said connecting member and extending in a direction perpendicular to a longitudinal axis of said axle so that said handle and said wheels provide a three point support system.

25. The device of claim 17 wherein said frame means includes guides which extend from said frame means straddling said axle to provide limits on vertical motion on said frame means and constrains horizontal motion on said frame means with respect to said axle.

* * * * *